United States Patent
Taschuk et al.

(10) Patent No.: US 12,513,797 B2
(45) Date of Patent: Dec. 30, 2025

(54) METHOD OF AND SYSTEM FOR CONTROLLING AT LEAST ONE ILLUMINATION APPARATUS

(71) Applicant: G2V OPTICS INC., Edmonton (CA)

(72) Inventors: Michael Thomas Taschuk, Edmonton (CA); Ryan Thomas Tucker, Edmonton (CA)

(73) Assignee: G2V OPTICS INC., Edmonton (CA)

( * ) Notice: Subject to any disclaimer, the term of this patent is extended or adjusted under 35 U.S.C. 154(b) by 243 days.

(21) Appl. No.: 18/029,494

(22) PCT Filed: Oct. 4, 2021

(86) PCT No.: PCT/CA2021/051386
§ 371 (c)(1),
(2) Date: Mar. 30, 2023

(87) PCT Pub. No.: WO2022/073107
PCT Pub. Date: Apr. 14, 2022

(65) Prior Publication Data
US 2023/0371145 A1    Nov. 16, 2023

Related U.S. Application Data

(60) Provisional application No. 63/087,478, filed on Oct. 5, 2020.

(51) Int. Cl.
*H05B 45/12* (2020.01)
*H05B 45/20* (2020.01)

(52) U.S. Cl.
CPC .................................... *H05B 45/12* (2020.01)

(58) Field of Classification Search
CPC ........ H05B 45/10; H05B 45/12; H05B 45/20; H05B 47/155; H05B 47/11; H05B 47/10
See application file for complete search history.

(56) References Cited

U.S. PATENT DOCUMENTS

| 7,019,662 B2 | 3/2006 | Shackle |
| 8,531,134 B2 | 9/2013 | Chemel et al. |

(Continued)

FOREIGN PATENT DOCUMENTS

| CN | 101387379 B | * 10/2010 |
| EP | 1712961 A1 | 10/2006 |
| EP | 2401775 A0 | 9/2010 |

OTHER PUBLICATIONS

International Search Report issued by the Canadian Intellectual Property Office on Jan. 25, 2022 in connection with PCT Patent Application No. PCT/CA2021/051386, 5 pages.

(Continued)

*Primary Examiner* — Henry Luong

(57) ABSTRACT

According to at least one embodiment, there is disclosed a method of controlling at least one illumination apparatus comprising a plurality of light sources operable to emit a plurality of different spectral distributions of light, each light source of the plurality of light sources operable to emit a respective one of the plurality of different spectral distributions of light, the method comprising compensating for a degradation of at least one of the plurality of light sources emitting one of the plurality of different spectral distributions of light, wherein compensating for the degradation of the at least one of the plurality of light sources comprises: increasing an electric power supplied to the at least one of the plurality of light sources; and reducing a difference between an overall spectral distribution of light emitted by the plurality of light sources and a desired overall spectral distribution of light.

24 Claims, 6 Drawing Sheets

(56) References Cited

U.S. PATENT DOCUMENTS

| | | |
|---|---|---|
| 10,718,492 B2 | 7/2020 | Harrold et al. |
| 2007/0100571 A1 | 5/2007 | Miki |
| 2010/0109439 A1 | 5/2010 | Tachino et al. |
| 2010/0141175 A1 | 6/2010 | Hasnain et al. |
| 2015/0250106 A1* | 9/2015 | Wik .................. H05B 45/22 315/158 |
| 2019/0360644 A1 | 11/2019 | Schinagl |
| 2020/0267810 A1 | 8/2020 | Chemel et al. |

OTHER PUBLICATIONS

Written Opinion of the International Searching Authority issued by the Canadian Intellectual Property Office on Jan. 25, 2022 in connection with PCT Patent Application No. PCT/CA2021/051386, 5 pages.

\* cited by examiner

METHOD OF AND SYSTEM FOR CONTROLLING AT LEAST ONE ILLUMINATION APPARATUS

CROSS-REFERENCE TO RELATED APPLICATIONS

This application is a National Phase Entry of international PCT patent application no. PCT/CA2021/051386 filed on Oct. 4, 2021, designating the United States, which claims the benefit of, and priority to, U.S. provisional patent application No. 63/087,478 filed on Oct. 5, 2020. The entire contents of the aforementioned applications are incorporated by reference herein.

FIELD

This disclosure relates generally to controlling at least one illumination apparatus.

RELATED ART

Some illumination apparatuses may not maintain consistent illumination over time.

SUMMARY

According to at least one embodiment, there is disclosed a method of controlling at least one illumination apparatus comprising a plurality of light sources operable to emit a plurality of different spectral distributions of light, each light source of the plurality of light sources operable to emit a respective one of the plurality of different spectral distributions of light, the method comprising compensating for a degradation of at least one of the plurality of light sources emitting one of the plurality of different spectral distributions of light, wherein compensating for the degradation of the at least one of the plurality of light sources comprises: increasing an electric power supplied to the at least one of the plurality of light sources; and reducing a difference between an overall spectral distribution of light emitted by the plurality of light sources and a desired overall spectral distribution of light.

In some embodiments, compensating for the degradation of the at least one of the plurality of light sources comprises compensating for a decrease in an efficiency of the at least one of the plurality of light sources.

In some embodiments, increasing the electric power supplied to the at least one of the plurality of light sources comprises increasing the electric power supplied to the at least one of the plurality of light sources according to an estimate of a reduction of efficiency of the at least one of the plurality of light sources.

In some embodiments, compensating for the degradation of the at least one of the plurality of light sources comprises compensating for the degradation of the at least one of the plurality of light sources according to, at least, data indicating at least a measurement, by at least one sensor, of luminous power of light emitted by the at least one of the plurality of light sources.

In some embodiments, the at least one illumination apparatus comprises the at least one sensor.

In some embodiments, the method further comprises causing the at least one sensor to measure the luminous power of the light emitted by the at least one of the plurality of light sources.

In some embodiments, causing the at least one sensor to measure the luminous power of the light emitted by the at least one of the plurality of light sources comprises causing the at least one sensor to measure luminous power of light reflected from at least one surface.

In some embodiments, the at least one surface comprises at least one surface of at least one photoactive material or device.

In some embodiments, the at least one surface comprises at least one surface of at least one solar cell.

In some embodiments, the at least one surface comprises at least one surface of at least one biological organism.

In some embodiments, the at least one surface comprises at least one surface of at least one insect.

In some embodiments, the at least one surface comprises at least one surface of at least one plant.

In some embodiments, the at least one surface is on at least one reflectivity reference standard.

In some embodiments, causing the at least one sensor to measure the luminous power of the light emitted by the at least one of the plurality of light sources comprises causing the at least one sensor to measure luminous power of light emitted from the plurality of light sources directly.

In some embodiments, causing the at least one sensor to measure the luminous power of the light emitted by the at least one of the plurality of light sources comprises causing the at least one sensor to measure luminous power of light emitted from the plurality of light sources when each one of the plurality of light sources, other than the at least one of the plurality of light sources, is not emitting the respective one of the plurality of different spectral distributions of light.

In some embodiments, causing the at least one sensor to measure the luminous power of the light emitted by the at least one of the plurality of light sources comprises causing the at least one sensor to measure luminous power of light emitted from the plurality of light sources when each one of the plurality of light sources is emitting the respective one of the plurality of different spectral distributions of light.

In some embodiments, compensating for the degradation of the at least one of the plurality of light sources comprises compensating for the degradation of the at least one of the plurality of light sources according to, at least, a function of degradation of the at least one of the plurality of light sources over time.

In some embodiments, the at least one of the plurality of light sources comprises a plurality of light emitters.

In some embodiments, each light emitter of the plurality of light emitters is operable to emit the respective one of the plurality of different spectral distributions of light.

In some embodiments, a first light emitter of the plurality of light emitters is operable to emit a first spectral distribution of light, and a second light emitter of the plurality of light emitters is operable to emit a second spectral distribution of light different from the first spectral distribution of light.

In some embodiments, at least one of the plurality of light sources comprises at least one light-emitting diode (LED).

In some embodiments, the at least one illumination apparatus comprises at least one interchangeable illumination assembly comprising the at least one of the plurality of light sources.

According to at least one embodiment, there is disclosed at least one computer-readable medium storing thereon program codes that, when executed by at least one processor, cause the at least one processor to implement the method.

According to at least one embodiment, there is disclosed a system programmed to implement the method.

Other aspects and features will become apparent to those ordinarily skilled in the art upon review of the following description of illustrative embodiments in conjunction with the accompanying figures.

DETAILED DESCRIPTION

Figure 1:
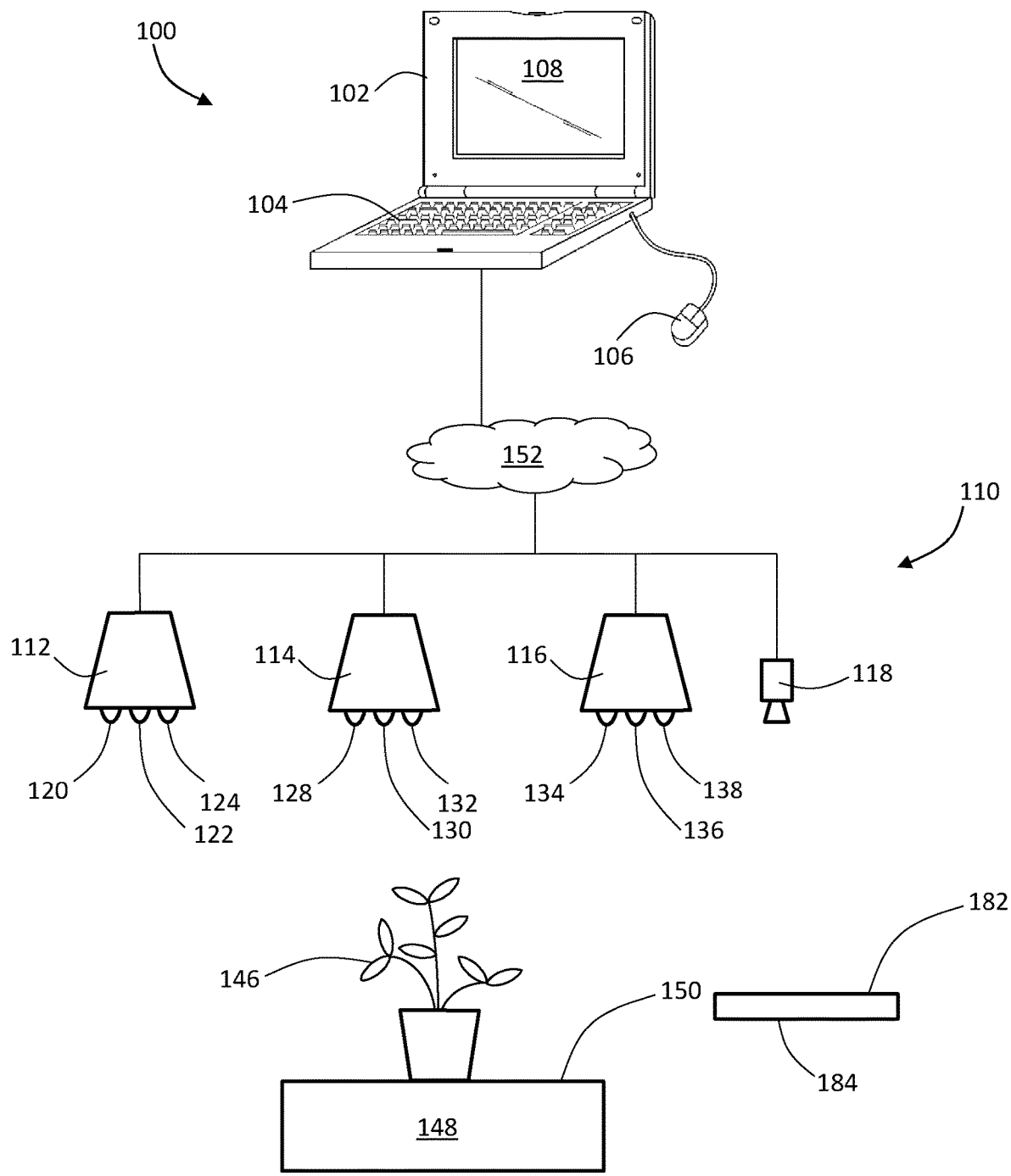
FIG. 1 schematically illustrates an illumination system according to one embodiment.

Referring to FIG. 1, an illumination system according to one embodiment is shown generally at 100 and includes a computer 102. The computer 102 in the embodiment shown is a laptop computer including a keyboard 104, a mouse 106, and a display screen 108. The computer 102 is an example only, and computers of alternative embodiments may differ. For example, computers of alternative embodiments may include one or more personal computers, one or more tablet computers, one or more server computers, or one or more different computing devices, and computers of alternative embodiments may include one or more different input devices and may include one or more different output devices.

Figure 2:
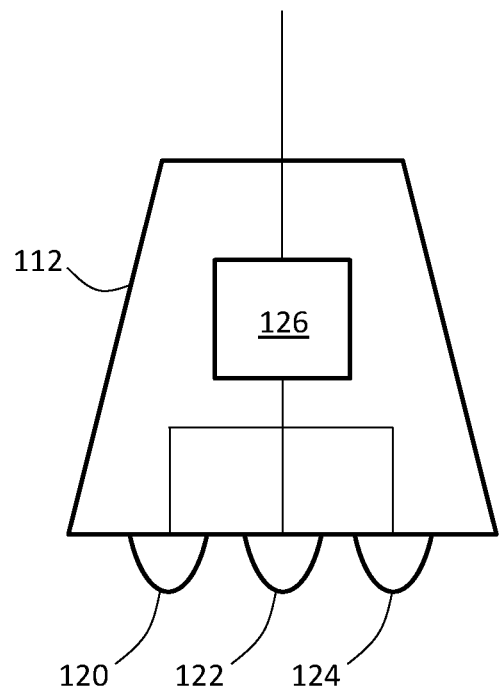
FIG. 2 is an elevation view of an illumination assembly of an illumination apparatus of the illumination system of FIG. 1.
Figure 3:
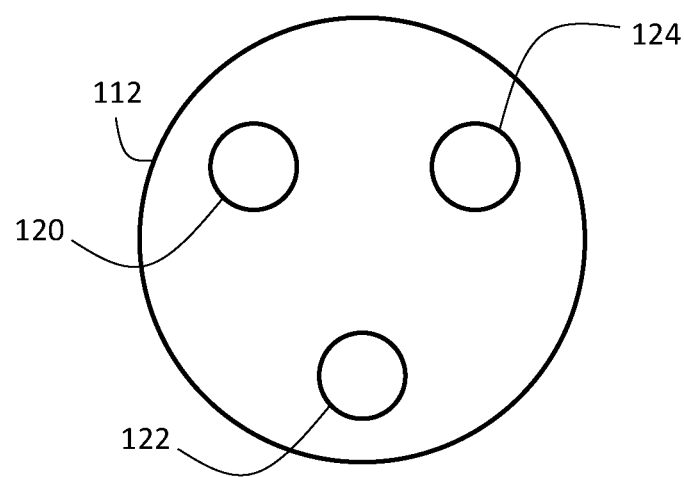
FIG. 3 is a bottom view of the illumination assembly of FIG. 2.

The system 100 also includes an illumination apparatus shown generally at 110. The illumination apparatus 110 includes an illumination assembly 112, an illumination assembly 114, an illumination assembly 116, and a sensor 118. As shown in FIGS. 1 to 3, the illumination assembly 112 includes light emitters 120, 122, and 124 and a controller 126 operable to control the light emitters 120, 122, and 124. The controller 126 may include a power supply or driver and one or more control components that may receive one or more signals from the computer 102 to control emission of light by the light emitters 120, 122, and 124 of the illumination assembly 112. The illumination assembly 114 includes light emitters 128, 130, and 132 and otherwise may be similar to the illumination assembly 112 and may include a controller similar to the controller 126. The illumination assembly 116 includes light emitters 134, 136, and 138 and otherwise may be similar to the illumination assembly 112 and may include a controller similar to the controller 126.

In some embodiments, one or more of the illumination assemblies 112, 114, and 116 may be an interchangeable light bar or other illumination assembly. In some embodiments, the light emitters of an illumination assembly may be on an interchangeable light bar or other illumination assembly, but the controller of the illumination assembly may be separate from the interchangeable light bar or other illumination assembly. In other embodiments, the light emitters of an illumination assembly and the controller of the illumination assembly may be on one interchangeable light bar or other illumination assembly.

Each of the light emitters 120, 122, 124, 128, 130, 132, 134, 136, and 138 may include one or more light-emitting diodes (LEDs) or other light emitters.

Each of the light emitters 120, 122, 124, 128, 130, 132, 134, 136, and 138 is operable to emit light in a respective spectral distribution of light. Herein, "light" is not limited to visible light, but may include electromagnetic radiation that may be visible, that may not be visible, or that may include both visible and invisible light. Also, herein, a "spectral distribution of light" may refer to monochromatic light or to light having a mixture of different wavelengths.

Figure 4:
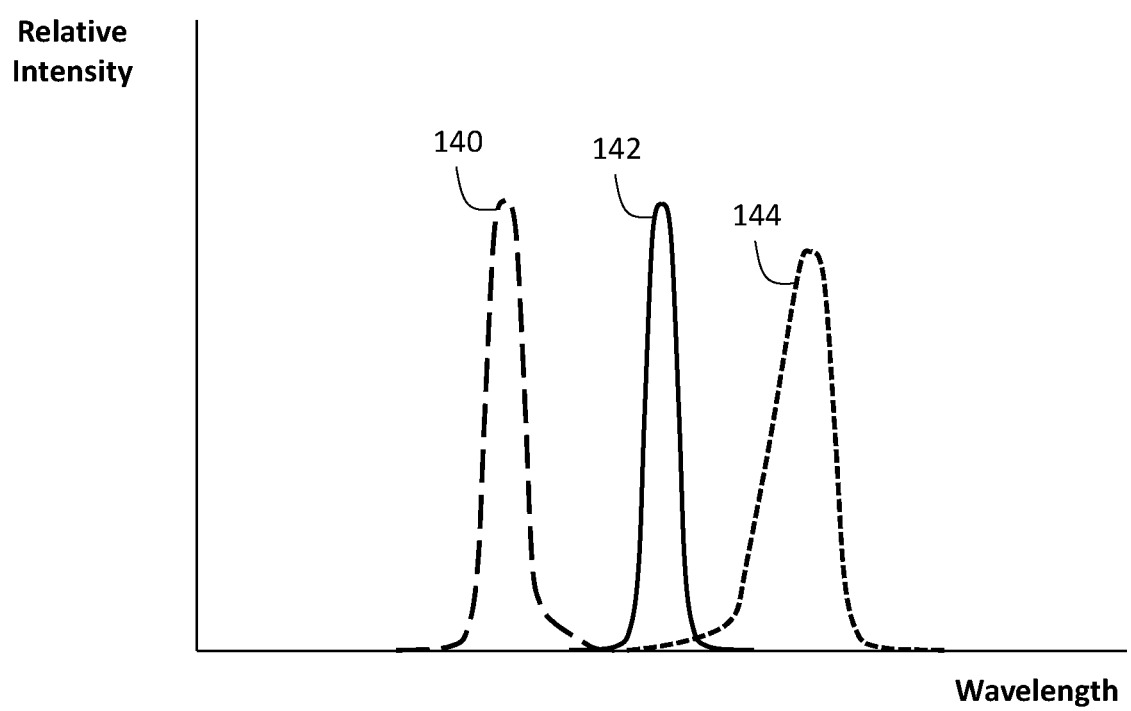
FIG. 4 schematically illustrates spectral distributions of light that may be emitted by light sources of the illumination apparatus of the illumination system of FIG. 1.

In a spectral distribution of light that includes a mixture of different wavelengths, light at each wavelength of the different wavelengths may be included in the spectral distribution of light at a respective relative intensity of the wavelength. For example, FIG. 4 illustrates a spectral distribution of light 140 including a mixture of different wavelengths, and FIG. 4 illustrates respective relative intensities of the different wavelengths of light in the spectral distribution of light 140. FIG. 4 also illustrates a spectral distribution of light 142 different from the spectral distribution of light 140 and including a mixture of different wavelengths, and FIG. 4 illustrates respective relative intensities of the different wavelengths of light in the spectral distribution of light 142. FIG. 4 also illustrates a spectral distribution of light 144 different from the spectral distributions of light 140 and 142 and including a mixture of different wavelengths, and FIG. 4 illustrates respective relative intensities of the different wavelengths of light in the spectral distribution of light 144.

For example, referring to FIGS. 1 and 4, in one embodiment,
1. the light emitters 120, 122, and 124 may each be operable to emit light in the spectral distribution of light 140,
2. the light emitters 128, 130, and 132 may each be operable to emit light in the spectral distribution of light 142, and
3. the light emitters 134, 136, and 138 may each be operable to emit light in the spectral distribution of light 144.

In general, one or more light emitter that emit a spectral distribution of light may be referred to as a light source or as part of a light source. Therefore, in the embodiment described above, the light emitters 120, 122, and 124 may be considered part of or all of one light source, the light emitters 128, 130, and 132 may be considered part of or all of another light source, and the light emitters 134, 136, and 138 may be considered part of or all of yet another light source.

However, alternative embodiments may differ. For example, and still referring to FIGS. 1 and 4, in one embodiment,
1. the light emitters 120, 122, and 124 may each be operable to emit light in a respective different spectral distribution of light such that the respective different spectral distribution of light of the light emitters 120, 122, and 124 may collectively be the spectral distribution of light 140, 2. the light emitters 128, 130, and 132 may each be operable to emit light in a respective different spectral distribution of light such that the respective different spectral distribution of light of the light emitters 128, 130, and 132 may collectively be the spectral distribution of light 142, and
3. the light emitters 134, 136, and 138 may each be operable to emit light in a respective different spectral distribution of light such that the respective different spectral distribution of light of the light emitters 134, 136, and 138 may collectively be the spectral distribution of light 144.

In such an embodiment, the light emitters 120, 122, and 124 may be considered part of or all of one light source, the light emitters 128, 130, and 132 may be considered part of or all of another light source, and the light emitters 134, 136, and 138 may be considered part of or all of yet another light source.

In the examples described above, the illumination assembly 112 may be one light source including light emitters operable to emit a first spectral distribution of light, the illumination assembly 114 may be another light source including light emitters operable to emit a second spectral distribution of light, and the illumination assembly 116 may be yet another light source including light emitters operable to emit a third spectral distribution of light. Therefore, in such embodiments, the controller 126 of the illumination assembly 112 may control emission of the first spectral distribution of light, the controller of the illumination assembly 114 may control emission of the second spectral distribution of light, and the controller of the illumination assembly 116 may control emission of the third spectral distribution of light. However, as indicated below, for example, alternative embodiments may differ.

As another example, and still referring to FIGS. 1 and 4, in one embodiment,
1. the light emitters 120, 128, and 134 may each be operable to emit light in the spectral distribution of light 140,
2. the light emitters 122, 130, and 136 may each be operable to emit light in the spectral distribution of light 142, and
3. the light emitters 124, 132, and 138 may each be operable to emit light in the spectral distribution of light 144.

In such an embodiment, the light emitters 120, 128, and 134 may be considered part of or all of one light source, the light emitters 122, 130, and 136 may be considered part of or all of another light source, and the light emitters 124, 132, and 138 may be considered part of or all of yet another light source.

As another example, and still referring to FIGS. 1 and 4, in one embodiment,
1. the light emitters 120, 128, and 134 may each be operable to emit light in a respective different spectral distribution of light such that the respective different spectral distribution of light of the light emitters 120, 128, and 134 may collectively be the spectral distribution of light 140,
2. the light emitters 122, 130, and 136 may each be operable to emit light in a respective different spectral distribution of light such that the respective different spectral distribution of light of the light emitters 122, 130, and 136 may collectively be the spectral distribution of light 142, and
3. the light emitters 134, 136, and 138 may each be operable to emit light in a respective different spectral distribution of light such that the respective different spectral distribution of light of the light emitters 124, 132, and 138 may collectively be the spectral distribution of light 144.

In such an embodiment, the light emitters 120, 122, and 124 may be considered part of or all of one light source, the light emitters 128, 130, and 132 may be considered part of or all of another light source, and the light emitters 134, 136, and 138 may be considered part of or all of yet another light source.

Further, in some embodiments, more than one light source may be operable to emit a same spectral distribution of light. For example, and still referring to FIGS. 1 and 4, in one embodiment,
1. the light emitters 120, 122, and 124 may each be operable to emit light in the spectral distribution of light 140,
2. the light emitters 128, 130, and 132 may each be operable to emit light in the spectral distribution of light 140, and
3. the light emitters 134, 136, and 138 may each be operable to emit light in the spectral distribution of light 142.

In such an embodiment, the light emitters 120, 122, and 124 may be considered part of or all of one light source, the light emitters 128, 130, and 132 may be considered part of or all of another light source, and the light emitters 134, 136, and 138 may be considered part of or all of yet another light source.

As another example, and still referring to FIGS. 1 and 4, in one embodiment,
1. the light emitters 120, 122, and 124 may each be operable to emit light in a respective different spectral distribution of light such that the respective different spectral distribution of light of the light emitters 120, 122, and 124 may collectively be the spectral distribution of light 140,
2. the light emitters 128, 130, and 132 may each be operable to emit light in a respective different spectral distribution of light such that the respective different spectral distribution of light of the light emitters 128, 130, and 132 may collectively be the spectral distribution of light 140, and
3. the light emitters 134, 136, and 138 may each be operable to emit light in a respective different spectral distribution of light such that the respective different spectral distribution of light of the light emitters 134, 136, and 138 may collectively be the spectral distribution of light 142.

In such an embodiment, the light emitters 120, 122, and 124 may be considered part of or all of one light source, the light emitters 128, 130, and 132 may be considered part of or all of another light source, and the light emitters 134, 136, and 138 may be considered part of or all of yet another light source.

As another example, and still referring to FIGS. 1 and 4, in one embodiment,
1. the light emitters 120, 128, and 134 may each be operable to emit light in the spectral distribution of light 140,
2. the light emitters 122, 130, and 136 may each be operable to emit light in the spectral distribution of light 140, and
3. the light emitters 124, 132, and 138 may each be operable to emit light in the spectral distribution of light 142.

In such an embodiment, the light emitters 120, 128, and 134 may be considered part of or all of one light source, the light emitters 122, 130, and 136 may be considered part of or all of another light source, and the light emitters 124, 132, and 138 may be considered part of or all of yet another light source.

As another example, and still referring to FIGS. 1 and 4, in one embodiment, 1. the light emitters 120, 128, and 134 may each be operable to emit light in a respective different spectral distribution of light such that the respective different spectral distribution of light of the light emitters 120, 128, and 134 may collectively be the spectral distribution of light 140,
2. the light emitters 122, 130, and 136 may each be operable to emit light in a respective different spectral distribution of light such that the respective different spectral distribution of light of the light emitters 122, 130, and 136 may collectively be the spectral distribution of light 140, and
3. the light emitters 134, 136, and 138 may each be operable to emit light in a respective different spectral distribution of light such that the respective different spectral distribution of light of the light emitters 124, 132, and 138 may collectively be the spectral distribution of light 142.

In such an embodiment, the light emitters 120, 122, and 124 may be considered part of or all of one light source, the light emitters 128, 130, and 132 may be considered part of or all of another light source, and the light emitters 134, 136, and 138 may be considered part of or all of yet another light source.

The embodiments described above are examples only, and alternative embodiments may differ. For example, alternative embodiments may include fewer or more than three spectral distributions of light. Further, the spectral distributions of light 140, 142, and 144 are examples only, and spectral distributions of light in alternative embodiments may differ. Still further, alternative embodiments may include fewer or more light emitters, may include alternatives to the light emitters 120, 122, 124, 128, 130, 132, 134, 136, and 138, may include fewer or more illumination assemblies, may include alternatives to the illumination assemblies 112, 114, and 116.

Nevertheless, embodiments such as those described above may include an illumination apparatus (such as the illumination apparatus 110, for example) operable to emit a plurality of different spectral distributions of light (such as the spectral distributions of light 140, 142, and 144, for example), and the illumination apparatus may include a plurality of light sources, each of which is operable to emit one of the plurality of different spectral distributions of light. In other words, a light source as described herein may include a single light emitter or a plurality of emitters that, individually or collectively, are operable to emit light in a spectral distribution of light.

Collectively, the illumination apparatus may be operable to emit an overall spectral distribution of light, which may be a linear combination of a plurality of different spectral distributions of light when each of a plurality of light sources as described above emits one of the plurality of different spectral distributions of light. For example, 20% of an overall spectral distribution of light may be the spectral distribution of light 140, 50% of the overall spectral distribution of light may be the spectral distribution of light 142, and 30% of the overall spectral distribution of light may be the spectral distribution of light 144. Alternative embodiments may differ and may include other combinations of other different spectral distributions of light.

Referring back to FIG. 1, the light emitters 120, 122, 124, 128, 130, 132, 134, 136, and 138 may be positioned to illuminate one or more objects to be illuminated, which may include one or more solar cells, one or more photoactive materials, one or more photoactive devices, one or more materials, one or more biological organisms, one or more algae, one or more insects, one or more plants, one or more other objects, or a combination of two or more thereof. A plant 146 is an object to be illuminated in the embodiment shown. Therefore, the illumination apparatus 110 may expose one or more objects to be illuminated to an overall spectral distribution of light as described above, for example. The plant 146 may be supported on a support structure 148 (such as a floor or table, for example) having a support surface 150.

The sensor 118 may be a camera, a photodiode, a single-pixel photodetector, a three-channel system, or another sensor operable to sense intensity of light at different wavelengths, and the sensor 118 may be positioned to sense intensity of light at different wavelengths reflected from one or more surfaces of one or more objects to be illuminated (such as the plant 146, for example), from the support surface 150, from one or more other surfaces, or from a combination of two or more thereof.

The system 100 further includes a computer network 152. The computer network 152 is in communication with the computer 102 and is also in communication with each of the illumination assemblies 112, 114, and 116 and with the sensor 118.

Figure 5:
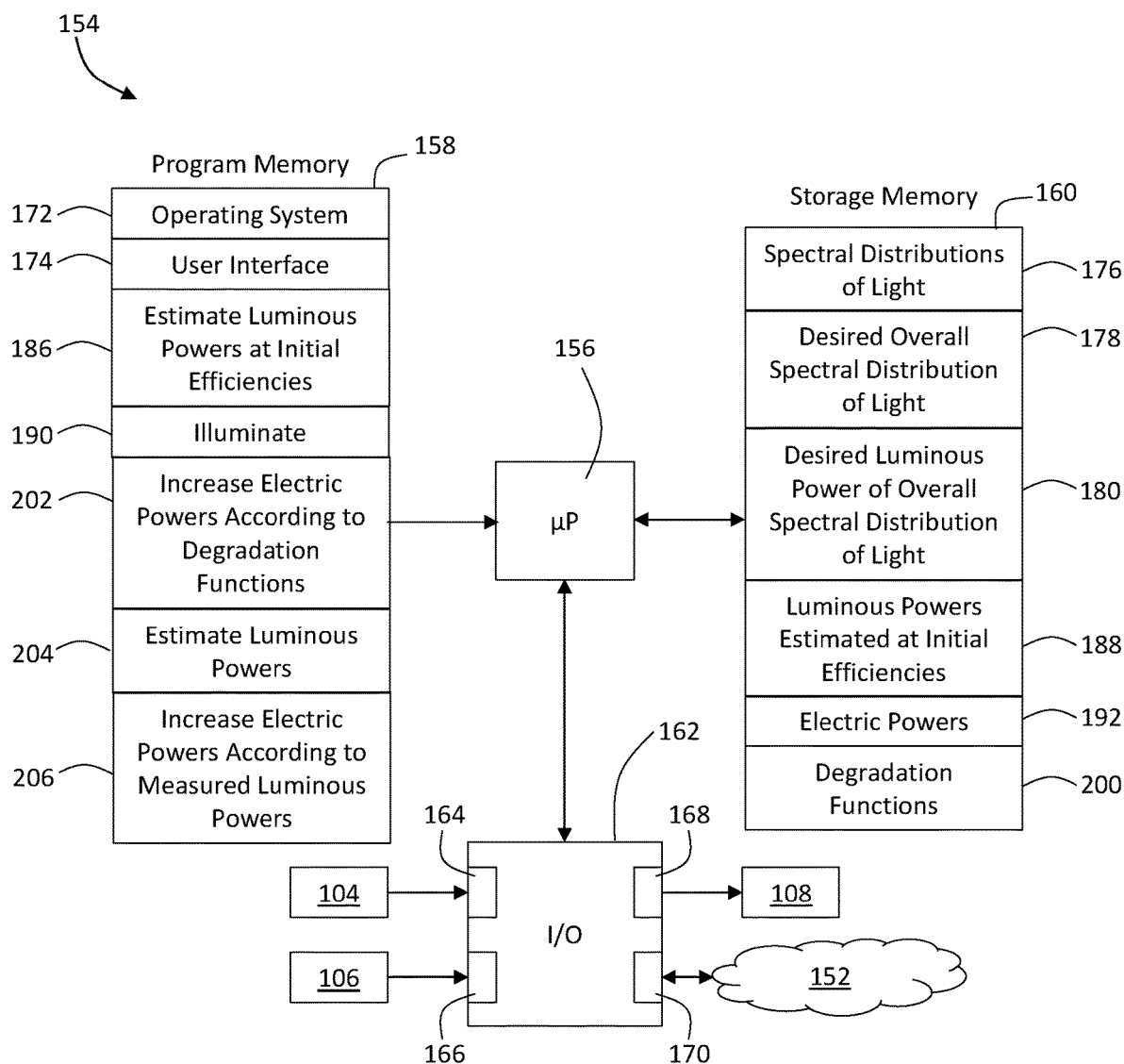
FIG. 5 schematically illustrates a processor circuit of a computer of the illumination system of FIG. 1.

Referring to FIG. 5, the computer 102 includes a processor circuit shown generally at 154. The processor circuit 154 includes a central processing unit ("CPU") or microprocessor 156. The processor circuit 154 also includes a program memory 158, a storage memory 160, and an input/output ("I/O") module 162 all in communication with the microprocessor 156. In general, the program memory 158 stores program codes that, when executed by the microprocessor 156, cause the processor circuit 154 to implement functions of the computer 102 such as those described herein, for example. Further, in general, the storage memory 160 includes stores for storing storage codes as described herein, for example. The program memory 158 and the storage memory 160 may be implemented in one or more of the same or different computer-readable storage media, which in various embodiments may include one or more of a read-only memory ("ROM"), random access memory ("RAM"), a hard disc drive ("HDD"), a solid-state drive ("SSD"), and other computer-readable and/or computer-writable storage media.

The I/O module 162 may include various signal interfaces, analog-to-digital converters ("ADCs"), digital-to-analog converters ("DACs"), receivers, transmitters, and/or other circuitry to receive, produce, and transmit signals as described herein, for example. In the embodiment shown, the I/O module 162 includes a keyboard input signal interface 164 for receiving input signals from the keyboard 104, and a mouse input signal interface 166 for receiving input signals from the mouse 106.

The I/O module 162 also includes a display screen output signal interface 168 for producing and transmitting signals for causing the display screen 108 to produce visible outputs. The I/O module 162 also includes a network interface 170 to transmit signals to, receive signals from, or transmit signals to and receive signals from the computer network 152.

The I/O module 162 is an example only and may differ in alternative embodiments. For example, alternative embodiments may include more, fewer, or different interfaces. More generally, the processor circuit 154 is an example only, and alternative embodiments may differ. For example, in alternative embodiments, the computer 102 may include different hardware, different software, or both. Such different hardware may include more than one microprocessor, one or more central processing units ("CPUs"), one or more machine learning chips, one or more cloud server computers, one or more other alternatives to the microprocessor 156, discrete logic circuits, or an application-specific integrated circuit ("ASIC"), or combinations of one or more thereof, for example.

The program memory 158 includes operating system program codes 172 of an operating system such as Microsoft Windows™ or another operating system, for example. The program memory 158 further includes user interface program codes 174 that, when executed by the microprocessor 156, cause the processor circuit 150 to control an interactive user interface of the user computing device 102.

Referring to FIGS. 1 and 5, as indicated above, the illumination apparatus 110 may be operable to emit a plurality of different spectral distributions of light, such as the spectral distributions of light 140, 142, and 144 for example. Therefore, the storage memory 160 may include a spectral distributions of light store 176 storing storage codes indicating the different spectral distributions of light that the illumination apparatus 110 is operable to emit.

As also indicated above, the illumination apparatus 110 may be operable to emit an overall spectral distribution of light, which may be a linear combination of the plurality of different spectral distributions of light. An overall spectral distribution of light may be desired, for example to provide a desired spectral distribution of light for one or more objects to be illuminated, such as the plant 146 in the embodiment shown. For example, a desired overall spectral distribution of light may be a linear combination of the plurality of different spectral distributions of light.

Therefore, the storage memory 160 may include a desired overall spectral distribution of light store 178 storing storage codes indicating a desired overall spectral distribution of light. For example, the desired overall spectral distribution of light store 178 may store storage codes indicating respective coefficients for each of a plurality of spectral distributions of light that the illumination apparatus 110 is operable to emit, and such coefficients may define the desired overall spectral distribution of light as a linear combination of the spectral distributions of light that the illumination apparatus 110 is operable to emit. For example, the desired overall spectral distribution of light store 178 may store storage codes indicating that 45% of a desired overall spectral distribution of light is the spectral distribution of light 140, 20% of the desired overall spectral distribution of light is the spectral distribution of light 142, and 35% of the desired overall spectral distribution of light is the spectral distribution of light 144. Alternative embodiments may differ and may include other combinations of other different spectral distributions of light, such as different desired overall spectral distributions of light at different times, such as spectral distributions of light at different times of day, spectral distributions of light at different times of year, or both, for example.

Further, one or more luminous powers of the desired overall spectral distribution of light may be desired. For example, in some embodiments, a desired luminous power of the desired overall spectral distribution of light may be constant over time. In other embodiments, a desired luminous power of the desired overall spectral distribution of light may vary over time, for example according to one or more functions of time, such as one or more functions of time of day, of time of year, or of both, for example. Therefore, the storage memory 160 may include a desired luminous power of overall spectral distribution of light store 180 storing storage codes indicating either a constant desired luminous power of the desired overall spectral distribution of light or one or more functions indicating a desired luminous power of the desired overall spectral distribution of light as a function of time.

Some light emitters, such as LEDs for example, may degrade over time, for example by having efficiency that decreases over time. In general, efficiency 77 of one or more light emitters may be defined as $$\eta = \frac{\Phi}{P}$$

where $\Phi$ is luminous power of light emitted by the one or more light emitters and P is electric power of electric current supplied to the one or more light emitters.

Therefore, one or more such light emitters may have an initial efficiency, namely an efficiency before the one or more such light emitters degrades by decreased efficiency, and light sources (as described above, for example) may each have a respective initial efficiency. As indicated above, a light source as described herein may include a single light emitter, in which case the initial efficiency of the light source may be the initial efficiency of the single light emitter. As also indicated above, a light source as described herein may include a plurality of emitters, in which case the initial efficiency of the light source may be the average of the initial efficiencies of the light emitters.

For example, if the light emitters 120, 122, and 124 are part of or all of one light source, then that light source may have an average initial efficiency of 45%, and if the light emitters 128, 130, and 132 are part of or all of another light source, then that light source may have an average initial efficiency of 50%, and if the light emitters 134, 136, and 138 are part of or all of another light source, then that light source may have an average initial efficiency of 40%.

Also, when the one or more light emitters of a light source have not degraded and the light source emits light at its initial efficiency, a luminous power of the light as reflected off of one or more surfaces may be measured. For example, if the light emitters 120, 122, and 124 are part of or all of one light source, then the sensor 118 may measure an intensity of light emitted by the light source and reflected off of one or more surfaces of one or more objects to be illuminated (such as the plant 146, for example), off of the support surface 150, off of a reference reflection surface 182 of a reference reflection body 184 (such as a reflectivity reference standard), off of one or more other surfaces, or off of a combination of two or more thereof. The reference reflection surface 182 may reflect light according to a known standard reflectivity.

Such measurements of intensity of light as measured by the sensor 118 may be used to estimate luminous power of one or more light sources illuminating one or more objects such as those described above, for example. For example, intensity of light as measured by the sensor 118, when one or more light sources illuminate one or more objects at a known luminous power, may be used to define a calibration function that may be used to estimate luminous power as a function of intensity of light as measured by the sensor 118. Of course different calibration functions may be defined and used for different surfaces of objects that may be illuminated.

In general, when a constant predefined reference electric power is applied to a light source, an estimate of a luminous power of light emitted by a light source and reflected off of one or more surfaces may be a baseline or reference measurement for later use as described herein, for example. Therefore, the program memory 158 may further include estimate luminous powers at initial efficiencies program codes 186 that, when executed by the microprocessor 156, cause the processor circuit 154 to cause the sensor 118 to measure—for one, for more than one, or for all of the light sources of the illumination apparatus 110—an intensity of light emitted by the light source and reflected off of one or more surfaces when a constant predefined reference electric power is applied to the light source, to estimate a luminous power of the light source from the measured intensity of light emitted by the light source and reflected off of the one or more surfaces, and to store storage codes indicating the estimated luminous powers at the initial efficiencies in a luminous powers estimated at initial efficiencies store 188 in the storage memory 160.

In some embodiments, the estimate luminous powers at initial efficiencies program codes 186 may, when executed by the microprocessor 156, cause the processor circuit 154 to cause only one light source of the illumination apparatus 110 to emit light when the sensor 118 measures the light emitted by the light source and reflected off of one or more surfaces. In such embodiments, the intensity of light emitted by the light source and reflected off of one or more surfaces may be measured by the sensor 118 without any light from any other light source of the illumination apparatus 110. In such embodiments, the sensor 118 may simply measure intensity of light emitted by the light source and reflected off of one or more surfaces.

However, in other embodiments, the estimate luminous powers at initial efficiencies program codes 186 may, when executed by the microprocessor 156, cause the processor circuit 154 to cause the sensor 118 to measure an intensity of light emitted by one light source and reflected off of one or more surfaces when one or more other light sources of the illumination apparatus 110 also emit light. In such embodiments, the sensor 118 may include a physical light frequency filter that filters out any light from the one or more other light sources of the illumination apparatus 110 to allow the sensor 118 to measure the intensity of light emitted by the one light source, or the sensor 118 processor circuit 154 may digitally filter out any light from the one or more other light sources of the illumination apparatus 110 to allow the intensity of light emitted by the one light source to be measured.

Further, the program memory 158 may include illuminate program codes 190 that, when executed by the microprocessor 156, cause the processor circuit 154 to cause controllers of the illumination assemblies 112, 114, and 116 (such as the controller 126 of the illumination assembly 112 as shown in FIG. 2) to supply an electric current, an electric voltage, or both to light sources (as described above, for example), the electric current, the electric voltage, or both having electric power according to storage codes in an electric powers store 192 in the storage memory 160. In general, the storage codes in the electric powers store 192 may indicate amounts of, electric current, electric voltage, or other aspects to determine electric power to supply to each of the light sources.

If the desired luminous power of overall spectral distribution of light store 180 stores storage codes indicating one or more functions indicating a desired luminous power of the desired overall spectral distribution of light as a function of time, then the storage codes in the electric powers store 192 may indicate amounts of electric power to supply to each of the light sources at a maximum desired luminous power of the overall spectral distribution of light, and when the desired luminous power of the overall spectral distribution of light is less than the maximum, then the amounts of electric power to supply to each of the light sources may be decreased from the amounts of electric power indicated by the storage codes in the electric powers store 192. For example, when the desired luminous power of the overall spectral distribution of light is 60% of the maximum, then the amounts of electric power to supply to each of the light sources may be approximately 60% of the amounts of electric power indicated by the storage codes in the electric powers store 192.

However, luminous power of a light source may not be a linear function of electric power supplied to the light source because, for example, efficiency of the light source may vary with different amounts of power supplied to the light source. In other words, when electric power supplied to a light source is 60% of an amount of electric power indicated by the storage codes in the electric powers store 192, then the luminous power of the light source may be more or less than 60% of the luminous power of the light source when supplied with 100% of the electric power indicated by the storage codes in the electric powers store 192. For example, efficiency of a light source may be a function of one or more variables such as an amount of electric power (or electric current or electric voltage) supplied to the light source, such that efficiency of a light source may increase, decrease, or both increase and decrease with increasing electric power supplied to the light source. Also, efficiency of a light source may be a function of a temperature of the light source, and may be a function of an amount of usage time that the light source has operated.

Therefore, when the desired luminous power of the overall spectral distribution of light is 60% of the maximum, for example, then the amounts of electric power to supply to each of the light sources may be approximately 60% of the amounts of electric power indicated by the storage codes in the electric powers store 192 but with some correction to account for non-linearity in efficiency of the light source caused by one or more variables such as a change in electric power (or electric current or electric voltage) supplied to the light source, a temperature of the light source, an amount of usage time that the light source has operated, or a combination of two or all thereof.

In general, if efficiency of a light source is estimated according to a function of electric power supplied to the light source, a temperature of the light source, an amount of time that the light source has operated, or a combination of two or all thereof, then an electric power that will cause the light source to have a desired luminous power may be calculated by estimating the electric power that, when supplied to the light source, will cause the light source to have the desired luminous power in view of such an efficiency function.

For example, if the luminous power emitted by a light source is estimated according to a function $\Phi(P, U, T)$ of electric power P supplied to the light source, of an amount of usage time U that the light source has operated, and of a temperature T of the light source, if an electric power $P_0$ is currently supplied to the light source and causing the light source to emit luminous power $\Phi_1$, and if an increased luminous power $\Phi_0$ is desired from the light source, then an increased power $P_1$ to cause the light source to emit the increased luminous power $\Phi_0$ may be directly determined by increasing $P_1$ with the luminous power under direct measurement until the luminous power approaches $\Phi_0$, or estimated by estimating $P_1$ that satisfies $\Phi(P_1, U, T)-\Phi_1=0$. Such estimation of electric power may involve numerical analysis such as root finding, for example using the Newton-Raphson method, to estimate $P_1$.

Therefore, the computer 102 may store data that may affect a function such as the function $\Phi(P, U, T)$. For example, the computer 102 may store data indicating historical usage of parts or all of the illumination apparatus 110 (such as amounts of usage time U that parts or all the light source has operated, or currents or voltages that were applied to light emitters of the illumination apparatus 110 have operated), or temperature, cooling processes, ambient or environmental cooling effects, humidity, other information, or a combination of two or more thereof that may affect a function such as the function (P, U, T).

Figure 6:
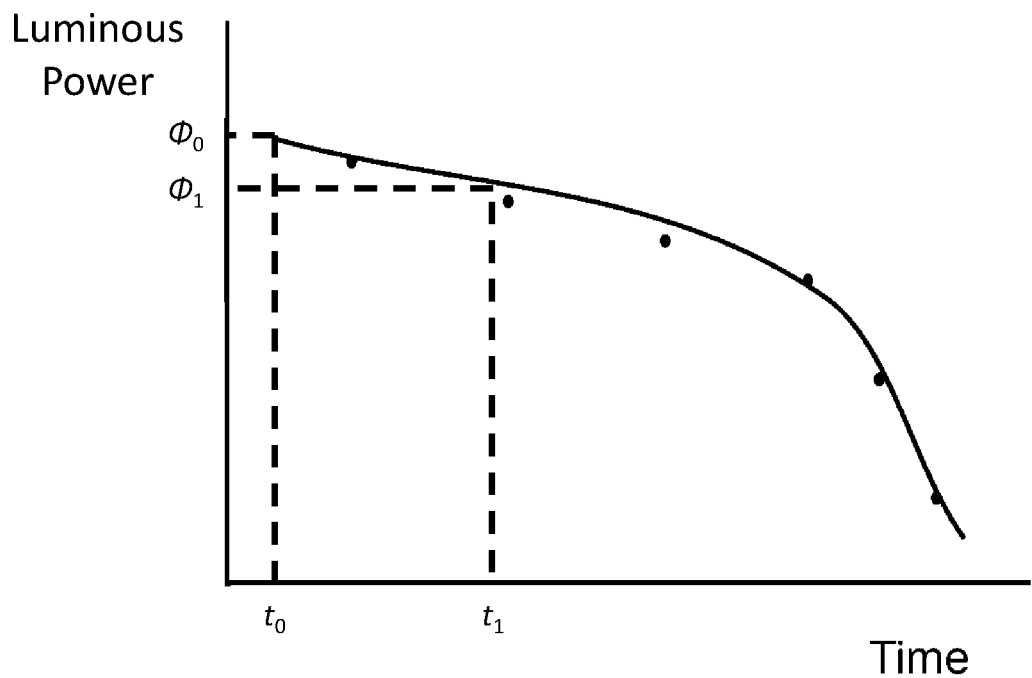
FIG. 6 schematically illustrates an example of a function of degradation of a light source over time according to one embodiment.

As indicated above, some light emitters, such as LEDs for example, may degrade over time, for example by having efficiency that decreases over time. For example, FIG. 6 illustrates an example of luminous power of light emitted by a light source as a function of time when a constant predefined reference electric power is applied to the light source. In other words, FIG. 6 illustrates an example of a function of degradation of a light source over time.

Therefore, when light emitters of light sources (as described above, for example) have not degraded and are operable to emit light at their initial efficiencies, amounts of electric power indicated by the storage codes in the electric powers store 192 may be less than maximum electric powers that can be supplied to the light sources. As a result, as the light emitters of the light sources degrade over time, the amounts of electric power indicated by the storage codes in the electric powers store 192 may be increased over time to reduce a difference between an actual or measured luminous power of the overall spectral distribution of light and the desired luminous power of the overall spectral distribution of light.

Figure 7:
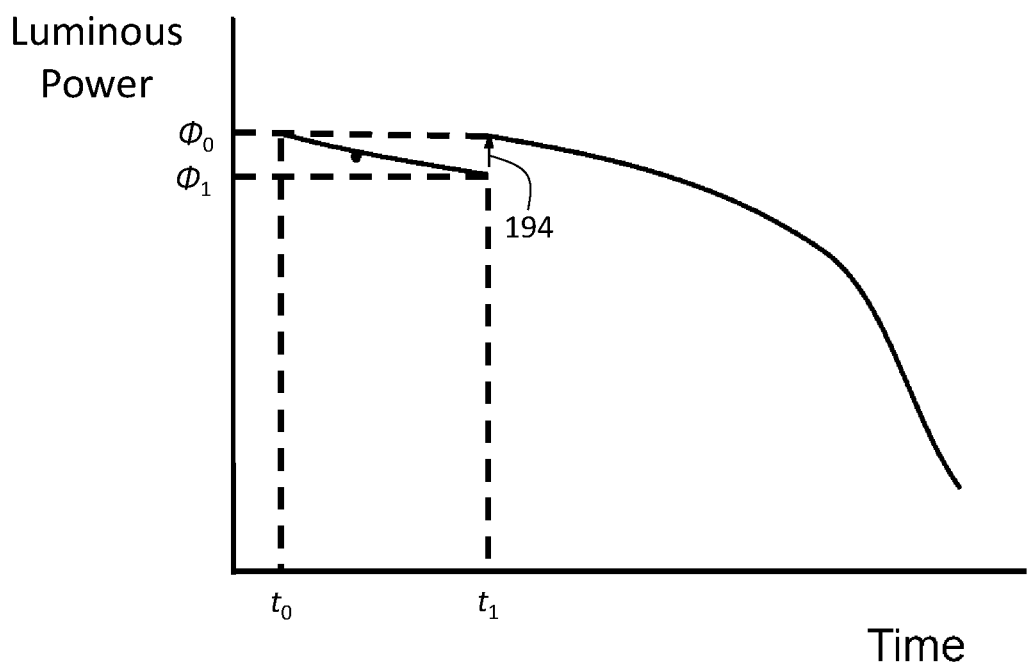
FIG. 7 schematically illustrates an example of luminous power of light emitted by a light source over time according to one embodiment when an amount of electric power is increased.

For example, FIG. 7 illustrates an example of luminous power of light emitted by a light source as a function of time when an amount of electric power is increased at 194 to reduce a difference ($\Phi_0-\Phi_1$) between an actual or measured luminous power $\Phi_0$ of the overall spectral distribution of light and the desired luminous power $\Phi_1$ of the overall spectral distribution of light.

Figure 8:
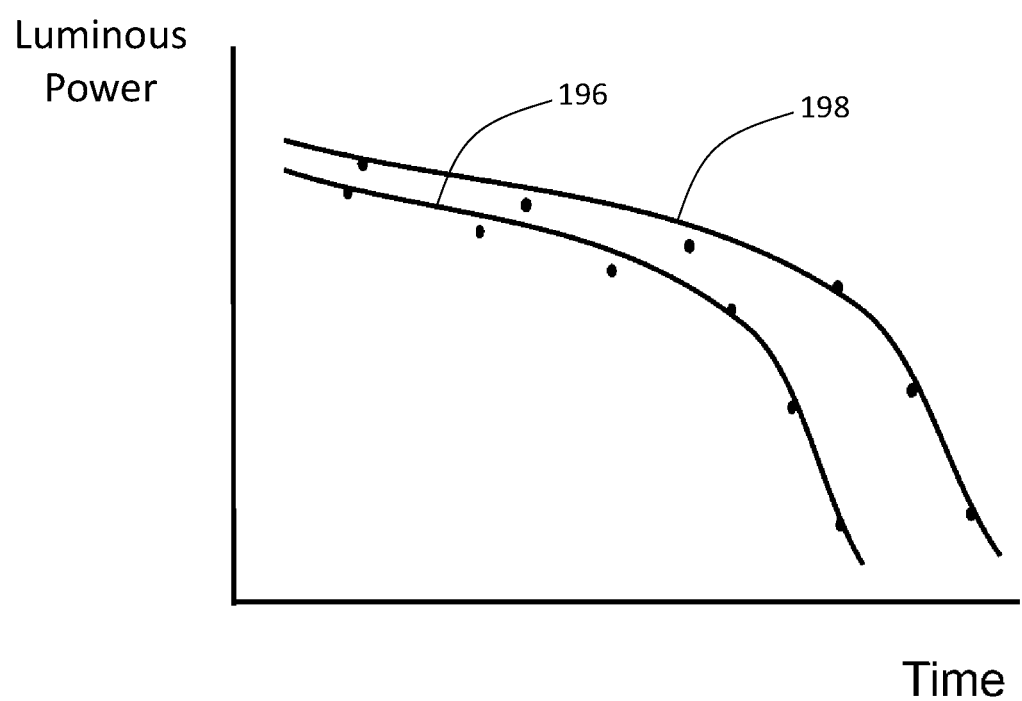
FIG. 8 schematically illustrates an example of respective different functions of degradation of two different light sources over time according to one embodiment.

Further, different light emitters may degrade at different rates. For example, one type of LED may degrade faster than another type of LED. FIG. 8 illustrates an example according to one embodiment in which one light source degrades according to a function of time 196, and a different light source degrades according to a function of time 198 different from the function of time 196. As a result, if electric powers applied to light sources (as described above, for example) remain constant over time, then different degradation of different light emitters of the light sources may cause an overall spectral distribution of light emitted by the light emitters to change over time.

Therefore, increases over time to the amounts of electric power indicated by the storage codes in the electric powers store 192 may differ for different light sources (as described above, for example) to reduce a difference between an actual or measured overall spectral distribution of light and the desired overall spectral distribution of light.

In some embodiments, the storage memory 160 may include a degradation functions store 200 storing storage codes indicating functions of degradation of light sources (as described above, for example) over time, and such functions of degradation may be the same as each other or different from each other. As indicated above, an example of a function of degradation of a light source over time is shown in FIG. 6. For example, if the light emitters 120, 122, and 124 are part of or all of one light source, if the light emitters 128, 130, and 132 are part of or all of another light source, and if the light emitters 134, 136, and 138 are part of or all of another light source, then storage codes in the degradation functions store 200 may store storage codes indicating one function of degradation over time of the light source including the light emitters 120, 122, and 124, storage codes indicating another function of degradation over time of the light source including the light emitters 128, 130, and 132, and storage codes indicating another function of degradation over time of the light source including the light emitters 134, 136, and 138, and such functions of degradation may be the same as each other or different from each other.

In such embodiments, the program memory 158 may further include increase electric powers according to degradation functions program codes 202 that, when executed by the microprocessor 156, cause the processor circuit 154 to increase the amounts of electric power indicated by the storage codes in the electric powers store 192 according to functions of degradation indicated by the storage codes in the degradation functions store 200.

For example, in the example of FIG. 6, when (at time $t_0$) a light source has not degraded and emits light at its initial efficiency, the light source emits light at an initial luminous power $\Phi_0$ when supplied with an initial electric power $P_0$. The light source thus has an initial efficiency $$\eta_0 = \frac{\Phi_0}{P_0}.$$

However, the function of degradation in the example of FIG. 6 indicates that, at a later time $t_1$, if the electric power remains at the initial electric power $P_0$, then the light source will emit light at a reduced luminous power $\Phi_1$ because the efficiency of the light source will have decreased from $\Phi_0$ to $$\eta_1 = \frac{\Phi_1}{P_0}.$$

Therefore, to restore the luminous power to the initial luminous power $\Phi_0$, the electric power supplied to the light source would have to increase to $P_1$.

As indicated above, efficiency of a light source may be estimated according to a function of electric power (or electric current) supplied to the light source, a temperature of the light source, an amount of time that the light source has operated, or a combination of two or all thereof, and an electric current that will cause the light source to have a desired luminous power may be calculated by estimating (using the Newton-Raphson method or another root-finding method, for example) the electric current that, when supplied to the light source, will cause the light source to have the desired luminous power in view of an efficiency function as described above.

Therefore, where the function of degradation indicates that, over a period of time, luminous power of light emitted by a light source decreases from a luminous power $\Phi_0$ to a reduced luminous power $\Phi_1$ when applied electric power remains constant, increasing the applied electric current or the electric power by a degradation factor that may be identified as described above to restore the luminous power of the light emitted by the light source to $\Phi_0$. An example of such an increase in applied electric power according to one embodiment is shown at 194 in FIG. 7.

Therefore, for a light source over a period of time, the increase electric powers according to degradation functions program codes 202 may, when executed by the microprocessor 156, cause the processor circuit 154 to increase the amount of electric power indicated by the storage codes in the electric powers store 192 for the light source by a degradation factor that may be identified as described above to restore the luminous power of the light emitted by the light source to $\Phi_0$. The illuminate program codes 190 may then, when executed by the microprocessor 156, cause the processor circuit 154 to cause the controllers of the illumination assemblies 112, 114, and 116 (such as the controller 126 of the illumination assembly 112 as shown in FIG. 2) to supply electric power to light sources (as described above, for example) according to the increased amounts of electric power indicated by the storage codes in the electric powers store 192.

The increase electric powers according to degradation functions program codes 202 may be executed continuously or at various times, such as at predefined time intervals, at manually initiated times, or both, for example.

In other embodiments, degradation of light sources may be measured, and the amounts of electric power indicated by the storage codes in the electric powers store 192 may be increased according to the measured degradation of the light sources.

In such embodiments, the program memory 158 may further include estimate luminous powers program codes 204 that, when executed by the microprocessor 156, cause the processor circuit 154 to cause the sensor 118 to measure—for one, for more than one, or for all of the light sources of the illumination apparatus 110—an intensity of light emitted by the light source and reflected off of one or more surfaces when the same constant predefined reference electric power is applied to the light source as was applied when luminous powers were estimated at initial efficiencies as described above with reference to the estimate luminous powers at initial efficiencies program codes 186.

In some embodiments, the estimate luminous powers program codes 204 may, when executed by the microprocessor 156, cause the processor circuit 154 to cause only one light source of the illumination apparatus 110 to emit light when the sensor 118 measures the light emitted by the light source and reflected off of one or more surfaces. In such embodiments, the intensity of light emitted by the light source and reflected off of one or more surfaces may be measured by the sensor 118 without any light from any other light source of the illumination apparatus 110. In such embodiments, the sensor 118 may simply measure intensity of light emitted by the light source and reflected off of one or more surfaces.

However, in other embodiments, the measure intensities program codes 204 may, when executed by the microprocessor 156, cause the processor circuit 154 to cause the sensor 118 to measure an intensity of light emitted by one light source and reflected off of one or more surfaces when one or more other light sources of the illumination apparatus 110 also emit light. In such embodiments, the sensor 118 may include a physical light frequency filter that filters out any light from the one or more other light sources of the illumination apparatus 110 to allow the sensor 118 to measure the intensity of light emitted by the one light source, or the sensor 118 processor circuit 154 may digitally filter out any light from the one or more other light sources of the illumination apparatus 110 to allow the intensity of light emitted by the one light source to be measured.

In other words, the measure intensities program codes 204, when executed by the microprocessor 156, may cause the processor circuit 154 to cause the sensor 118 to measure intensities of light emitted by the light sources as described above with reference to the measure intensities at initial efficiencies program codes 186, but after the light sources have degraded from their initial efficiencies. The estimate luminous powers program codes 204, when executed by the microprocessor 156, may further cause the processor circuit 154 to estimate a luminous power of the light source from the measured intensity of light emitted by the light source and reflected off of the one or more surfaces.

The luminous powers estimated after the light sources have degraded may then be compared to the initial efficiencies indicated by the storage codes in the luminous powers estimated at initial efficiencies store 188. Again, if the storage codes in the luminous powers estimated at initial efficiencies store 188 indicate that, at its initial efficiency, a light source emitted light at an initial luminous power $\Phi_0$ when supplied with an initial electric power $P_0$, and if the light source emits light at a reduced luminous power $\Phi_1$ after the light source degraded, then increasing the electric current or the electric power supplied to the light source by a degradation factor as described above, for example, may restore the luminous power of the light emitted by the light source to $\Phi_0$.

Therefore, in some embodiments, the program memory 158 may further include increase electric powers according to measured luminous powers program codes 206 that, when executed by the microprocessor 156, cause the processor circuit 154 to increase the amounts of electric power indicated by the storage codes in the electric powers store 192 according to luminous powers estimated after light sources have degraded in response to execution of the measure estimate luminous powers program codes 204. For example, if an estimated luminous power of light emitted by a light source after degradation of the light source is $\Phi_1$ when a constant predefined reference electric power $P_0$ is applied to the light source, and if the storage codes in the luminous powers estimated at initial efficiencies store 188 indicate that, at its initial efficiency, the light source emitted light at an initial luminous power $\Phi_0$ when supplied with the constant predefined reference electric power $P_0$, then the increase electric powers according to measured luminous powers program codes 206 may, when executed by the microprocessor 156, cause the processor circuit 154 to increase an amount of electric power indicated by the storage codes in the electric powers store 192 by a degradation factor as described above, for example. The illuminate program codes 190 may then, when executed by the microprocessor 156, cause the processor circuit 154 to cause the controllers of the illumination assemblies 112, 114, and 116 (such as the controller 126 of the illumination assembly 112 as shown in FIG. 2) to supply electric power to light sources (as described above, for example) according to the increased amounts of electric power indicated by the storage codes in the electric powers store 192.

The increase electric powers according to measured luminous powers program codes 206 may be executed continuously or at various times, such as at predefined time intervals, at manually initiated times, or both, for example.

In summary, embodiments such as those described above may reduce a difference between an actual or estimated luminous power of the overall spectral distribution of light and a desired luminous power of the overall spectral distribution of light, and embodiments such as those described above may also reduce a difference between an actual or measured overall spectral distribution of light and the desired overall spectral distribution of light. Reducing such differences may facilitate providing consistent illumination, for example to one or more objects to be illuminated, which may include one or more solar cells, one or more photoactive materials, one or more photoactive devices, one or more materials, one or more biological organisms, one or more algae, one or more insects, one or more plants, one or more other objects, or a combination of two or more thereof.

Although specific embodiments have been described and illustrated, such embodiments should be considered illustrative only and not as limiting the invention as construed according to the accompanying claims.

The invention claimed is:

1. A method of controlling at least one illumination apparatus comprising a plurality of light sources operable to emit a plurality of different spectral distributions of light, each light source of the plurality of light sources operable to emit a respective one of the plurality of different spectral distributions of light, the method comprising:
    compensating for a degradation of at least one of the plurality of light sources emitting one of the plurality of different spectral distributions of light, wherein compensating for the degradation of the at least one of the plurality of light sources comprises:
        increasing an electric power supplied to the at least one of the plurality of light sources; and
        reducing a difference between an overall spectral distribution of light emitted by the plurality of light sources and a desired overall spectral distribution of light,
wherein compensating for the degradation of the at least one of the plurality of light sources comprises compensating for the degradation of the at least one of the plurality of light sources according to, at least, data indicating at least a measurement, by at least one sensor, of luminous power of light emitted by the at least one of the plurality of light sources;
the method further comprising causing the at least one sensor to measure the luminous power of the light emitted by the at least one of the plurality of light sources,
wherein causing the at least one sensor to measure the luminous power of the light emitted by the at least one of the plurality of light sources comprises causing the at least one sensor to measure luminous power of light reflected from at least one surface; and
wherein the at least one surface comprises at least one surface of at least one photoactive material or device.

2. The method of claim 1 wherein compensating for the degradation of the at least one of the plurality of light sources comprises compensating for the degradation of the at least one of the plurality of light sources according to, at least, a function of degradation of the at least one of the plurality of light sources over time.

3. At least one computer-readable medium storing thereon program codes that, when executed by at least one processor, cause the at least one processor to implement the method of claim 1.

4. A system programmed to implement the method of claim 1.

5. A method of controlling at least one illumination apparatus comprising a plurality of light sources operable to emit a plurality of different spectral distributions of light, each light source of the plurality of light sources operable to emit a respective one of the plurality of different spectral distributions of light, the method comprising:
    compensating for a degradation of at least one of the plurality of light sources emitting one of the plurality of different spectral distributions of light, wherein compensating for the degradation of the at least one of the plurality of light sources comprises:
        increasing an electric power supplied to the at least one of the plurality of light sources; and
        reducing a difference between an overall spectral distribution of light emitted by the plurality of light sources and a desired overall spectral distribution of light,
wherein compensating for the degradation of the at least one of the plurality of light sources comprises compensating for the degradation of the at least one of the plurality of light sources according to, at least, data indicating at least a measurement, by at least one sensor, of luminous power of light emitted by the at least one of the plurality of light sources;
the method further comprising causing the at least one sensor to measure the luminous power of the light emitted by the at least one of the plurality of light sources,
wherein causing the at least one sensor to measure the luminous power of the light emitted by the at least one of the plurality of light sources comprises causing the at least one sensor to measure luminous power of light reflected from at least one surface; and
wherein the at least one surface comprises at least one surface of at least one solar cell.

6. At least one computer-readable medium storing thereon program codes that, when executed by at least one processor, cause the at least one processor to implement the method of claim 5.

7. A system programmed to implement the method of claim 5.

8. The method of claim 5 wherein compensating for the degradation of the at least one of the plurality of light sources comprises compensating for the degradation of the at least one of the plurality of light sources according to, at least, a function of degradation of the at least one of the plurality of light sources over time.

9. A method of controlling at least one illumination apparatus comprising a plurality of light sources operable to emit a plurality of different spectral distributions of light, each light source of the plurality of light sources operable to emit a respective one of the plurality of different spectral distributions of light, the method comprising:
    compensating for a degradation of at least one of the plurality of light sources emitting one of the plurality of different spectral distributions of light, wherein compensating for the degradation of the at least one of the plurality of light sources comprises:
        increasing an electric power supplied to the at least one of the plurality of light sources; and
        reducing a difference between an overall spectral distribution of light emitted by the plurality of light sources and a desired overall spectral distribution of light,
wherein compensating for the degradation of the at least one of the plurality of light sources comprises compensating for the degradation of the at least one of the plurality of light sources according to, at least, data indicating at least a measurement, by at least one sensor, of luminous power of light emitted by the at least one of the plurality of light sources;

the method further comprising causing the at least one sensor to measure the luminous power of the light emitted by the at least one of the plurality of light sources, wherein causing the at least one sensor to measure the luminous power of the light emitted by the at least one of the plurality of light sources comprises causing the at least one sensor to measure luminous power of light reflected from at least one surface; and wherein the at least one surface comprises at least one surface of at least one biological organism.

10. At least one computer-readable medium storing thereon program codes that, when executed by at least one processor, cause the at least one processor to implement the method of claim 9.

11. A system programmed to implement the method of claim 9.

12. The method of claim 9 wherein compensating for the degradation of the at least one of the plurality of light sources comprises compensating for the degradation of the at least one of the plurality of light sources according to, at least, a function of degradation of the at least one of the plurality of light sources over time.

13. A method of controlling at least one illumination apparatus comprising a plurality of light sources operable to emit a plurality of different spectral distributions of light, each light source of the plurality of light sources operable to emit a respective one of the plurality of different spectral distributions of light, the method comprising:

compensating for a degradation of at least one of the plurality of light sources emitting one of the plurality of different spectral distributions of light, wherein compensating for the degradation of the at least one of the plurality of light sources comprises:

increasing an electric power supplied to the at least one of the plurality of light sources; and reducing a difference between an overall spectral distribution of light emitted by the plurality of light sources and a desired overall spectral distribution of light, wherein compensating for the degradation of the at least one of the plurality of light sources comprises compensating for the degradation of the at least one of the plurality of light sources according to, at least, data indicating at least a measurement, by at least one sensor, of luminous power of light emitted by the at least one of the plurality of light sources;

the method further comprising causing the at least one sensor to measure the luminous power of the light emitted by the at least one of the plurality of light sources, wherein causing the at least one sensor to measure the luminous power of the light emitted by the at least one of the plurality of light sources comprises causing the at least one sensor to measure luminous power of light reflected from at least one surface; and wherein the at least one surface comprises at least one surface of at least one insect.

14. At least one computer-readable medium storing thereon program codes that, when executed by at least one processor, cause the at least one processor to implement the method of claim 13.

15. A system programmed to implement the method of claim 13.

16. The method of claim 13 wherein compensating for the degradation of the at least one of the plurality of light sources comprises compensating for the degradation of the at least one of the plurality of light sources according to, at least, a function of degradation of the at least one of the plurality of light sources over time.

17. A method of controlling at least one illumination apparatus comprising a plurality of light sources operable to emit a plurality of different spectral distributions of light, each light source of the plurality of light sources operable to emit a respective one of the plurality of different spectral distributions of light, the method comprising:

compensating for a degradation of at least one of the plurality of light sources emitting one of the plurality of different spectral distributions of light, wherein compensating for the degradation of the at least one of the plurality of light sources comprises:

increasing an electric power supplied to the at least one of the plurality of light sources; and reducing a difference between an overall spectral distribution of light emitted by the plurality of light sources and a desired overall spectral distribution of light, wherein compensating for the degradation of the at least one of the plurality of light sources comprises compensating for the degradation of the at least one of the plurality of light sources according to, at least, data indicating at least a measurement, by at least one sensor, of luminous power of light emitted by the at least one of the plurality of light sources;

the method further comprising causing the at least one sensor to measure the luminous power of the light emitted by the at least one of the plurality of light sources, wherein causing the at least one sensor to measure the luminous power of the light emitted by the at least one of the plurality of light sources comprises causing the at least one sensor to measure luminous power of light reflected from at least one surface; and wherein the at least one surface comprises at least one surface of at least one plant.

18. At least one computer-readable medium storing thereon program codes that, when executed by at least one processor, cause the at least one processor to implement the method of claim 17.

19. A system programmed to implement the method of claim 17.

20. The method of claim 17 wherein compensating for the degradation of the at least one of the plurality of light sources comprises compensating for the degradation of the at least one of the plurality of light sources according to, at least, a function of degradation of the at least one of the plurality of light sources over time.

21. A method of controlling at least one illumination apparatus comprising a plurality of light sources operable to emit a plurality of different spectral distributions of light, each light source of the plurality of light sources operable to emit a respective one of the plurality of different spectral distributions of light, the method comprising:

compensating for a degradation of at least one of the plurality of light sources emitting one of the plurality of different spectral distributions of light, wherein compensating for the degradation of the at least one of the plurality of light sources comprises:

increasing an electric power supplied to the at least one of the plurality of light sources; and reducing a difference between an overall spectral distribution of light emitted by the plurality of light sources and a desired overall spectral distribution of light, wherein compensating for the degradation of the at least one of the plurality of light sources comprises compensating for the degradation of the at least one of the plurality of light sources according to, at least, data indicating at least a measurement, by at least one sensor, of luminous power of light emitted by the at least one of the plurality of light sources;

the method further comprising causing the at least one sensor to measure the luminous power of the light emitted by the at least one of the plurality of light sources, wherein causing the at least one sensor to measure the luminous power of the light emitted by the at least one of the plurality of light sources comprises causing the at least one sensor to measure luminous power of light reflected from at least one surface; and wherein the at least one surface is on at least one reflectivity reference standard.

22. At least one computer-readable medium storing thereon program codes that, when executed by at least one processor, cause the at least one processor to implement the method of claim 21.

23. A system programmed to implement the method of claim 21.

24. The method of claim 21 wherein compensating for the degradation of the at least one of the plurality of light sources comprises compensating for the degradation of the at least one of the plurality of light sources according to, at least, a function of degradation of the at least one of the plurality of light sources over time.

* * * * *